April 5, 1960     J. A. DEVER     2,931,763
CONTROL APPARATUS
Filed Aug. 3, 1956
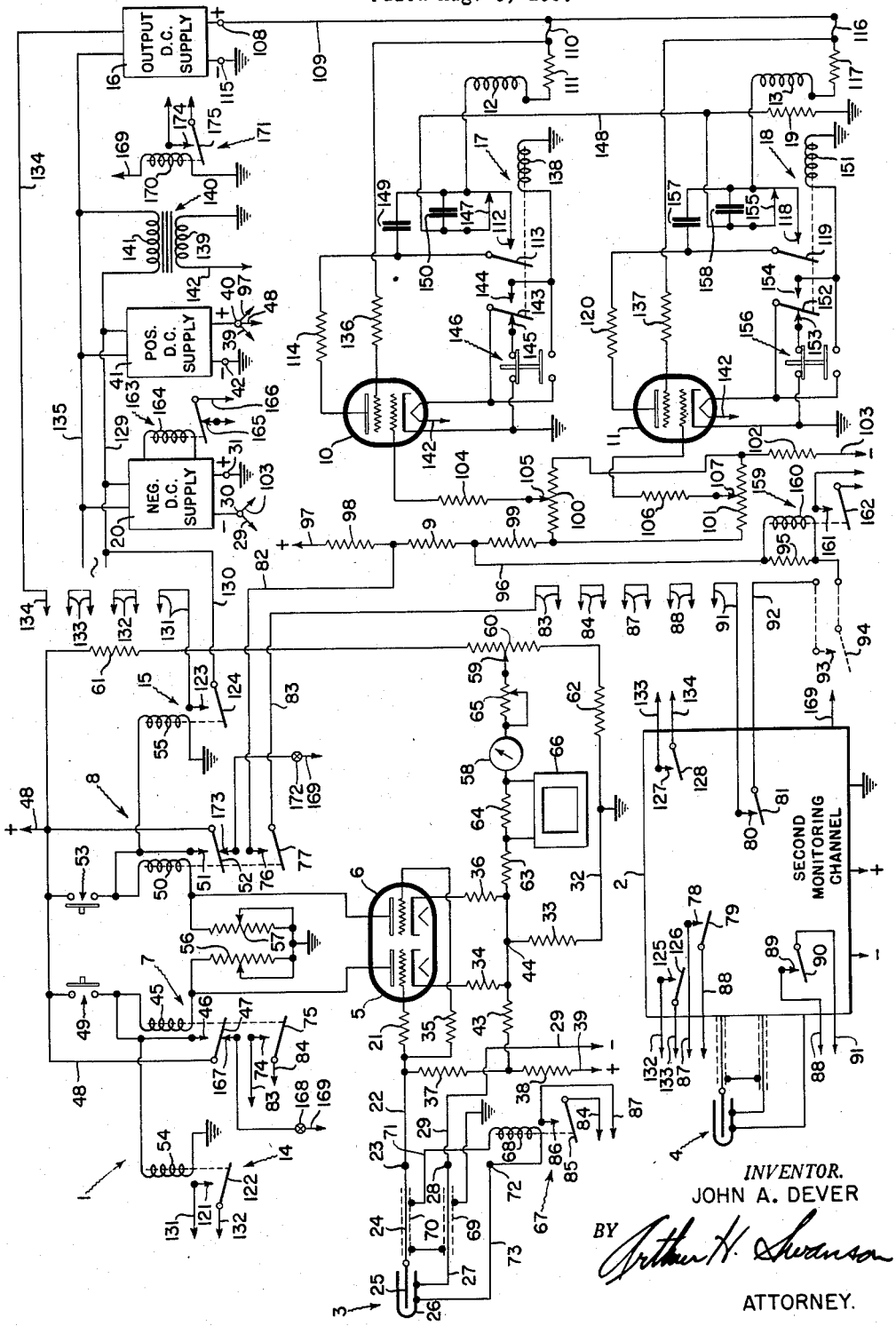
INVENTOR.
JOHN A. DEVER
BY
ATTORNEY.

2,931,763
Patented Apr. 5, 1960

2,931,763

CONTROL APPARATUS

John A. Dever, Gladwyne, Pa., assignor to Minneapolis-Honeywell Regulator Company, Minneapolis, Minn., a corporation of Delaware Application August 3, 1956, Serial No. 601,989

19 Claims. (Cl. 204—193.2)

The present invention relates generally to safety control apparatus for monitoring the value of a condition, and for providing a safety control effect upon the attainment of a predetermined value of said condition. Specifically, the present invention relates to a novel form of such apparatus which is especially well suited for use as the safety control apparatus for a nuclear reactor, which is operative in the manner stated above notwithstanding the occurrence of certain types of component failure in and associated with the apparatus, and which is operative to provide said control effect, independently of the value of said condition, as a direct result of the occurrence of other types of component failure in and associated with the apparatus.

The development of the art of automatic control as applied to critical arrangements and processes has created a need for improved safety monitoring and control apparatus embodying a higher degree of reliability, higher speeds of response, and greater freedom from false shut-downs than have been obtainable with the previously known safety control arrangements. While this fact is surely true with respect to the field of automatic temperature control, it is especially true with respect to the field of automatic control of nuclear processes and reactions, where operating conditions are highly critical, subject to extremely rapid changes, and potentially extremely dangerous.

Specifically, the automatic control arrangements which have been applied to the operation of nuclear reactors, for example, have made it absolutely necessary that the operation of the reactor be separately monitored by safety control apparatus having the highest possible degree of reliability, dependability, response speed, and freedom from false operation. The need for such safety control apparatus arises because the regular automatic control equipment controlling the normal operation of the reactor is inherently incapable of shutting-down the reactor, and hence reducing its power, quickly enough to prevent damage and dangerous conditions following the occurrence of unsafe or potentially unsafe flux conditions in the reactor.

Such safety control apparatus must continuously monitor the level or value of the neutron flux density in the controlled reactor, and must be capable of dropping the safety rods into the reactor core, thereby to provide safety or emergency shut-down of the reactor, in an extremely short time following the occurrence of such unsafe conditions in the reactor as an increase in the neutron flux density level above a predetermined safe value, or a rate of change of flux level in excess of a predetermined safe value.

Moreover, such safety control apparatus must perform the foregoing emergency reactor shut-down or safety control effect, upon the occurrence of the above unsafe reactor operating conditions, even though one or more of certain components of the safety control apparatus has failed or is otherwise not operating properly. It is necessary also that such component failure or malfunctioning, which does not render the safety apparatus or continued operation of the reactor unsafe, be prevented from effecting reactor shut-down itself, due to the need for continuity of reactor operation.

On the other hand, it is necessary that component failure or malfunctioning of certain other types, which render the safety apparatus and hence continued reactor operation unsafe, such as short-circuiting of the flux level monitoring ion chambers or failure of certain of the safety apparatus electron tubes, be caused to effect reactor shut-down independently of the reactor flux level or its rate of change. Such operation is necessary to insure that reactor operation will be suspended as long as critical portions of the monitoring system are not capable of performing their necessary, intended functions.

Furthermore, it is requisite to obtaining the required continuity of reactor operation that only the predetermined, unsafe types of failure referred to immediately above be permitted to effect reactor shut-down in the absence of actual reactor conditions necessitating such shut-down, and that the safety apparatus be equipped with the necessary circuitry to keep false shut-downs, those due to other than unsafe reactor or safety apparatus conditions, to a minimum.

Additionally, it is necessary, from the safety standpoint at least, that the safety control apparatus include indicating and/or annunciating means serving to keep the associated personnel advised as to such conditions as proper connection and operation of the safety apparatus, reactor flux level or power, and the failure or improper operation of those components and circuitry of the safety apparatus whose failure is not immediately unsafe and hence does not automatically produce reactor shut-down.

Finally, it is requisite to the maintenance of the safe operation of the automatically controlled reactor, and for the continued safety for the associated personnel and equipment, that the safety control apparatus perform in the above manner at all times, with a high degree of dependability, so that the development of unsafe or potentially unsafe conditions, either in the reactor or in the safety equipment itself, will always cause the safety control apparatus to effect emergency reactor shut-down before actually dangerous conditions can occur.

In short, the required safety control apparatus for use with a controlled nuclear reactor is an arrangement which will back-up the regular reactor control equipment, and which will, under practically all conditions of the apparatus, provide a safety control effect, resulting in emergency reactor shut-down, upon and only upon the occurrence of any condition in the reactor or associated equipment which renders continued reactor operation unsafe or potentially unsafe.

Since the nature of nuclear processes and reactors places such stringent requirements upon apparatus which is to function properly and safely as safety control apparatus for such reactors, there is a need for improved apparatus which will meet these requirements and be entirely suitable for such exacting use.

OBJECTS OF THE INVENTION

Accordingly, it is a prime object of the present invention to provide novel safety control apparatus which meets the foregoing requirements, and which is, therefore, especially well suited for use with a nuclear reactor. Because of this latter fact, the following objectives and description of the invention will refer to the apparatus thereof in its use as the safety control apparatus for a nuclear reactor. It is to be borne in mind, however, that the safety control apparatus of the invention is also well adapted for monitoring and providing safety control effects for a variety of processes and conditions, such as temperature, pressure, flow, and the like.

In accordance with the foregoing, it is a general object of the present invention to provide novel safety control apparatus of the type described above which is arranged to provide a safety control effect, such as the shutting-down of a nuclear reactor, upon the occurrence of a predetermined value of a condition being monitored, such as the reactor neutron flux level or rate of change thereof, even in the presence of certain types of component failure or malfunctioning in and associated with the apparatus, and which is also arranged to provide said control effect as a direct result of other types of component failure or malfunctioning in and associated with the apparatus, independently of the value of said condition.

A specific object of the invention is to provide a novel form of safety control apparatus of the foregoing type for use with a controlled nuclear reactor, which apparatus includes a control section operative to provide said control effect and to lower a plurality of safety rods in the reactor in response to either of two different trip effects or stimuli applied respectively to two different operating portions of said control section, and which includes a monitoring section normally operative to apply both of said trip effects to said control section upon the attainment of a predetermined value of either the reactor neutron flux level or the rate of change of this level.

A more specific object of the invention is to provide novel apparatus as just described wherein said control section is normally operative to respond to one of said trip effects, and to produce said control effect, during an appreciably shorter time period than that required for said control section to respond to the other of said trip effects to produce said control effect.

Another specific object of the invention is to provide novel apparatus as specified above wherein said control section includes a plurality of output channels for energizing a plurality of reactor safety rod-holding magnets or clutches, wherein each of said channels has a controlling device associated therewith for controlling the application of an energizing or rod-holding signal to the corresponding one of said channels, and wherein the application of said one of said trip effects to said control section normally actuates all of said devices to deenergize said channels to drop said rods, while application of said other of said trip effects to said control section operates also to deenergize all of said channels and to drop said rods independently of said devices and said one trip effect.

A more specific object of the invention is to provide novel apparatus as just specified wherein each of said devices is an electron tube having a heater element subject to burnout, and wherein there are included means responsive to the condition of said heaters and operative to correlate the deenergization of said channels in response to said trip effects with the number of heaters which may have burned out.

An even more specific object of the invention is to provide novel apparatus as just described wherein failure of a number of said heaters below a predetermined number removes the corresponding channels from control of their energization by said one of said trip effects, but not said other trip effect, while failure of a number of said heaters equal to or in excess of said predetermined number causes the corresponding channels to be effectively deenergized independently of either or both of said trip effects.

Other specific objects of the invention are to provide novel apparatus of the type specified which includes numerous cooperating components and circuitry for fulfilling the foregoing requirements of continuity, dependability, and high speed of operation, continuity of reactor operation, indication of reactor and safety apparatus condition, freedom from false shut-downs, and the production of reactor shut-down upon the development of conditions in the reactor or safety equipment which render continued reactor operation unsafe or potentially unsafe.

BRIEF DESCRIPTION OF AN EMBODIMENT OF THE INVENTION

To the end of fulfilling the foregoing objects and requirements, novel safety control apparatus is provided in accordance with the present invention which is arranged to receive in its input the output signals of at least two ion chambers which are strategically located in the reactor. Each of these signals operates through a pair of amplifier tubes to control the energization of a plurality of relays, the contacts of which are arranged to control the conductivity of a plurality of control tubes. Each of these control tubes controls the energization of an individual one of a plurality of output channels, each of which is adapted to energize an associated rod-holding magnet or clutch to cause it to hold its safety rod out of the reactor core as long as the monitored reactor neutron flux level does not exceed a predetermined value. When the flux level does exceed said value, the relays operate to cut off the control tubes and hence deenergize the output channels, which in turn causes the rods to drop and the reactor to be shut down.

Such operation of the relays also operates a second plurality of relays having contacts controlling the supply of energizing voltage to the output channels. Thus, upon operation of the first relays, the second relays cause positive deenergization of the output channels, which positively causes the rods to drop in the event that they have not already done so by virtue of the operation of the control tubes.

Any failure or improper operation of a component which cuts off the control tubes, which cuts off the supply of energizing voltage to the output channels, or which otherwise deenergizes these channels causes shut-down of the reactor, independently of the level of the monitored flux. However, the improper operation or failure of components which do not cause operation of any of the relays will not of themselves produce reactor shut-down. Arrangements are made in the apparatus for indicating and/or announcing the occurrence of such failures or improper operation so that the proper corrective steps can be taken.

The apparatus also includes means associated with the heaters of the control tubes which are operative, upon burn-out of a control tube heater, to remove the defective tube from control of the corresponding output channel energization, and to cause this channel to be energized through a resistor. Deenergization of this channel can then be effected only by removal of the source of channel energizing voltage, as by the operation of the above second relays. If the heater of a second control tube fails before the other defective control tube has been replaced, however, the second heater failure causes both of the associated output channels to be effectively deenergized and to drop their rods.

The apparatus according to the present invention also contains numerous other components and circuitry which cooperate in providing operation according to the foregoing objects and requirements for such apparatus. This will be apparent from the following detailed description of a preferred embodiment of the invention, which description will provide a better understanding of the invention when read in connection with the accompanying single figure of drawing in which there is shown the schematic circuit diagram of a preferred form of nuclear reactor safety control apparatus according to the present invention.

GENERAL OPERATION OF THE APPARATUS

The novel safety control apparatus illustrated in the drawing and comprising a preferred embodiment of the present invention is an arrangement designed for use with a nuclear reactor, to back-up the regular automatic control equipment controlling the normal operation of the reactor, for the express purpose of insuring safe reactor operation. Such safety control apparatus is needed to prevent the extensive damage which an unprotected or run-away reactor is capable of doing.

During normal reactor operation, the illustrated safety control apparatus holds the safety rods out of the reactor core to maintain continuity of operation as the reactor control rods are adjusted by the regular automatic control equipment to regulate the nuclear reaction rate and the reactor flux level and power. However, at the first sign of the development of a condition leading to unsafe operation, such as the occurrence of an excessive neutron flux level or an excessive rate of change of flux level, the safety control apparatus operates to develop two trip effects, either or both of which cause the production of a safety control effect which results in deenergization of the safety rod-holding means. The safety rods then move rapidly into the reactor core to terminate the nuclear reaction before dangerous conditions occur.

Further, the development of any component failure or apparatus defect which renders continued reactor operation hazardous or unsafe causes the production of said safety control effect, independently of the flux level, either directly or by producing one or both of said trip effects. As a result, the reactor is shut down and maintained in this condition until the apparatus defect has been corrected.

GENERAL DESCRIPTION OF THE APPARATUS

To the end of providing the foregoing operation, the novel safety control apparatus illustrated in the drawing comprises a monitoring section, appearing at the left of the drawing, and a control section, appearing at the right of the drawing. The monitoring section is made up of two identical monitoring channels which have been designated by the respective reference characters 1 and 2. Each of these channels is operative under certain conditions to apply one or both of said trip effects to the control section to cause it to produce its safety control effect. The circuit details of only the channel 1 have been shown in the drawing, inasmuch as the circuit details of the channel 2 are identical to the illustrated details of the channel 1. Thus, the channel 2 has been shown in block diagram form together with the necessary connections between the rectangle representing the channel 2 and the control section of the apparatus.

In this connection, it is noted that the safety control apparatus of the invention need not be limited in practice to but two monitoring channels as illustrated, but instead can include as many monitoring channels as necessary or desirable for the particular application involved. However, the illustrated apparatus with two monitoring channels serves completely to illustrate the invention without undue complexity.

For the purpose of providing a preliminary, over-all description of the construction and operation of the illustrated apparatus of the drawing, it is noted that the input of each of the two monitoring channels 1 and 2 is arranged to receive the output signal of a corresponding one of two ion chambers 3 and 4 which are strategically located in the reactor, not shown, whose operation is to be monitored and safely controlled by the illustrated apparatus. The output of the chamber 3 is applied to the paralleled inputs of a pair of amplifying electron tubes 5 and 6 included in a bridge circuit configuration within the channel 1. Although shown herein as being contained in a single envelope, the tubes 5 and 6 may instead be contained in separate envelopes, if desired. Separate relays 7 and 8, respectively included in the output circuits of the tubes 5 and 6, are arranged to be energized as long as the neutron flux level in the reactor at the ion chamber 3 is below a predetermined value.

A pair of normally open contacts of the relay 7 is connected in series with a corresponding pair of normally open contacts of the relay 8; and these contacts are in turn connected in a series circuit with the corresponding relay contacts of the channel 2, and other relay contacts to be described, across a negative bias resistor 9 which is effectively included in the input circuits of a pair of reactor safety rod magnet-controlling electron tubes 10 and 11 included in a first operating portion of the control section of the apparatus. Each of these control tubes 10 and 11 controls the energization of an individual one of a plurality of output channels, each of which is adapted to energize an associated one of a pair of rod-holding magnets or clutches 12 and 13 to cause it to hold its safety rod out of the reactor core as long as the corresponding control tube is conducting current.

As long as the monitored flux level is below said predetermined value, and assuming normal operation of the apparatus, all of the amplifier tubes conduct sufficient current to maintain all of the foregoing relays energized and all of the foregoing relay contacts closed. The negative bias resistor 9 is thereby shorted out of the inputs of the control tubes 10 and 11, whereby these tubes conduct sufficient current to energize the output channels and cause the magnets to hold out the rods.

The occurrence of an increase in flux level above said predetermined value cuts off the amplifier tubes, deenergizes the relays, and opens the relay contacts, thereby applying a first trip effect to the operating portion of the control section including the control tubes 10 and 11. Specifically, this opening of the relay contacts, which were short-circuiting the resistor 9, cuts off the control tubes 10 and 11, deenergizes the output channels, and permits the magnets to drop the rods into the reactor core, thereby shutting down the reactor. This is the so-called fast scram action of the apparatus, since a time period of the order of only a few milliseconds elapses between the occurrence of the excessive flux level and shut-down of the reactor.

Moreover, any component failure or other condition which causes any of the aforementioned relay contacts to open, or which otherwise causes the output channels to be deenergized, permits the rods to drop and hence shuts down the reactor by means of the foregoing fast scram action, independently of the actual level of the monitored flux.

Upon cut-off of the amplifier tubes 5 and 6, and/or the corresponding tubes in the channel 2, due to excessive neutron flux level or any other cause, the aforementioned second trip effect is produced in the apparatus by means of a second pair of relays included in each channel.

With reference to channel 1, these second relays are relays 14 and 15, each of which is individual to and controlled by a respective one of the fast scram relays 7 and 8. Thus, each of relays 14 and 15 is energized and deenergized by the corresponding operation of the associated one of the relays 7 and 8. The normally open contacts of the relays 14 and 15 are connected in series with the contacts of the corresponding second relays in channel 2 and with a source of control tube output and output channel energizing voltage 16 included in a second operating portion of the control section. Accordingly, deenergization of any or all of these second relays, such as relays 14 and 15, as by cut-off of the amplifier tubes, positively deenergizes the output channels and causes the reactor rods to drop and to shut down the reactor. This action occurs independently of any action by the control tubes 10 and 11, and hence independently of the first trip effect or fast scram action. This action is referred to herein as a slow scram action because it is inherently slower than the fast scram action in operating to effect reactor shut-down. This slow scram action backs-up the fast scram action, since it positively effects reactor shut-down, following the occurrence of an excessive flux level or other condition, in the event that the fast scram action has failed for one reason or another to have already caused the reactor to be shut down.

As for the fast scram action, any component failure or other condition which causes any of the slow scram relay contacts to open positively removes the output channel energizing source from the magnet circuits and hence permits the rods to drop and shut down the reactor if this has not already occurred, such action being independent of the actual level of the monitored flux.

Before starting the detailed description of the apparatus, a general description will be presented of the means within the apparatus which prevents heater burnout or other heater failure in either of the control tubes 10 and 11 from causing the corresponding rod-holding magnet 12 or 13 to be deenergized solely by virtue of such heater failure. This means also, however, effectively deenergizes both of the output channels and magnets 12 and 13 is a second one of the control tubes 10 and 11 should develop a heater failure before the other tube with its inoperative heater has been replaced.

This operation is achieved in the apparatus by the operation of heater burnout detecting relays 17 and 18 which are respectively associated with the heater energizing circuits of the control tubes 10 and 11. Upon heater failure in either of the tubes 10 and 11, the corresponding burnout relay operates to substitute an auxiliary or dummy load resistor 19 for the anode-cathode circuit of the defective tube in the energizing circuit or output channel of the corresponding one of the magnets 12 and 13. However, heater failure of the other control tube, occurring while the resistor 19 is already replacing the first defective control tube, causes effective deenergization of both of the magnets 12 and 13, since the value of the resistor 17 is desirably so chosen as to permit a magnet to hold a rod only as long as the energizing current of but a single magnet passes through the resistor 17.

It should be noted that the apparatus being described need not be limited in practice to but two output channels and magnets as illustrated, but instead can include and control as many output channels and magnets as necessary or desirable for the particular application involved. Each additional output channel and magnet would desirably be controlled by an additional, individual control tube which in turn would be controlled along with the tubes 10 and 11. However, the illustrated apparatus with its two output channels and rod-holding magnets serves completely to illustrate the present invention without undue complexity.

DETAILED DESCRIPTION OF THE APPARATUS

Amplifier tube circuits

As was previously noted, the amplifier tubes 5 and 6 control the energization of the respective fast scram relays 7 and 8, and hence control the energization of the respective slow scram relays 14 and 15, in accordance with the magnitude of the output signal of the ion chamber 3, which magnitude is a function of the neutron flux level in the vicinity of the chamber 3. Briefly, an increase in the neutron flux level in the vicinity of the chamber 3 causes an increase in the magnitude of the negative chamber output signal which is arranged to reduce the conductivity of the tubes 5 and 6. An excessive increase in the flux level cuts off this conductivity or at least reduces it below the drop-out value for the relays 7 and 8, which in turn apply the fast scram trip effect to the inputs of the control tubes 10 and 11 in the first operating portion of the control section. Drop-out of the relays 7 and 8 also causes drop-out of the slow scram relays 14 and 15 and hence the application of the slow scram trip effect to the output channel energizing portion of the control section including the supply 16.

To this end, the output signal of the chamber 3 is applied to the paralleled input or control grid-cathode circuits of the tubes 5 and 6. Specifically, the chamber 3 is connected between the control grids and cathodes of the tubes 5 and 6 in series with the output of a source of negative d.c. supply voltage 20. This series input circuit with respect to the tube 5 can be traced from the control grid of the tube 5 through an input isolating resistor 21, a conductor 22, a channel input terminal 23, and a shielded conductor 24 to the central electrode 25 of the chamber 3. From there the circuit continues through the chamber 3 to its outer electrode 26 and thence through a shielded conductor 27, a channel input terminal 28, and a conductor 29 to the negative terminal 30 of the supply 20. The circuit is completed through the supply 20 to the positive and grounded supply terminal 31 and thence through a grounded conductor 32, a resistor 33, and a resistor 34 to the cathode of the tube 5.

The input circuit of the tube 6 is effectively connected in parallel with the input of the tube 5 by means of an input isolating resistor 35 connected between the grid of the tube 6 and the conductor 22, and by means of a cathode resistor 36 connected between the cathode of the tube 6 and the junction between the resistors 33 and 34.

The input circuits of the tubes 5 and 6 also are connected to a biasing voltage arrangement consisting of resistors 37 and 38 connected in series between the conductor 22 and a conductor 39 which connects one end of the resistor 38 to the positive output terminal 40 of a source of positive d.c. supply voltage 41, the negative output terminal 42 of which is grounded in the apparatus. The junction between the resistors 37 and 38 is connected by a resistor 43 to the junction 44 between the aforementioned resistors 33, 34, and 36.

It can be seen from the circuitry which has been described above that the energizing current of the chamber 3 flows in the channel input circuit from the grounded positive output terminal 31 of the negative supply 20 to the conductor 32 and through the resistor 33, the junction 44, the resistor 43, and the resistor 37 to the conductor 22 and the chamber electrode 25. From there the current flows through the chamber 3 to the electrode 26 and thence over the conductors 27 and 29 to the negative output terminal 30 of the negative supply 20. The varying chamber current which thus flows through the resistors 33, 43, and 37 in series produces across the resistors 37 and 43 the useful chamber output signal which is applied to the inputs of the tubes 5 and 6 between their connected control grids and connected cathodes.

The connection of the negative supply voltage to the chamber 3 in the manner described above results in a grid-cathode or input signal for the tubes 5 and 6 which becomes more negative as the neutron flux level of the chamber 3 increases and thereby increases the conductivity of the chamber 3. Thus, increasing flux level decreases the current flowing in the output circuits of the tubes 5 and 6, thereby causing the relays 7 and 8 to be effectively deenergized when the flux level increases to or beyond a predetermined value. The connection of the relays 7 and 8 to the output circuits of the tubes 5 and 6 will be described in detail following the completion of the present description of the circuitry associated with the tube inputs.

The foregoing use of negative supply voltage for the chamber 3 provides safe operation in the event that the chamber 3 becomes short-circuited. Such short-circuiting places a large negative signal between the tube grids and cathodes which has the same effect on the tubes as an extremely high flux level, and which thus causes the relays 7 and 8 to drop out.

The absolute voltage level between the grids and cathodes of the tubes 5 and 6 is maintained positive by the foregoing circuitry so that accidental grounding of the input, such as grounding of the conductors 22 or 24, causes the tube cathodes to see a positive signal with respect to the effectively grounded grids. Such a signal has the same effect as a very high flux level, thereby causing the relays 7 and 8 to drop out. This positive absolute voltage level which is normally maintained at the input conductor 22 is produced jointly by the voltage drop produced across the resistor 33 by the combined cathode currents of tubes 5 and 6 flowing through this resistor, and by the fixed voltage added to the variable voltage across the resistor 43 by the resistor 38 connected to the positive terminal 40 of the supply 41.

To the end of controlling the operation of the relay 7 in accordance with the conductivity of the tube 5, the coil or winding 45 of the relay 7 is connected in the anode-cathode or output circuit of the tube 5. This circuit can be traced from the anode of the tube 5 through the winding 45 to a normally open contact 46 of the relay 7, and thence to a cooperating movable contact 47 of the relay which is connected to a conductor 48 in turn connected to the positive terminal 40 of the supply 41. The circuit then continues through the supply 41 to the grounded negative terminal 42 thereof, and thence through the conductor 32, the resistor 33, the junction 44, and the resistor 34 to the cathode of the tube 5.

Since the tube output current for energizing the relay 7 passes through the normally open contacts 46 and 47 of the relay, the relay energizing circuit is completed only while the relay is operatively energized and picked up. Thus, upon a decrease in tube output current which drops out the relay 7, the simultaneous opening of the contacts 46 and 47 removes the anode voltage from the tube 5 and seals out both the fast scram relay 7 and the slow scram relay 14 controlled thereby. When safe conditions have been reestablished, the relay 7, and hence the relay 14, can be reset or reenergized by means of a normally open push-button switch 49 connected across the relay contacts 46 and 47.

The output circuit of the triode 6 is connected to its associated relay 8 in the same manner as for the tube 5 and relay 7 as just described. Specifically, the anode of the tube 6 is connected through coil 50 and normally open contacts 51 and 52 of the relay 8 to the positive supply conductor 48. A resetting push-button switch 53 for the relay 8 is connected across the relay contacts 51 and 52.

The aforementioned control of the respective slow scram relays 14 and 15 by the corresponding fast scram relays 7 and 8 is achieved in the following manner. Coil 54 of the relay 14 is connected between the contact 46 of the relay 7 and ground, whereby relay 14 is operatively energized whenever the relay 7 is energized and causes its contact 47 to engage its contact 46 and thus supply positive voltage from the conductor 48 to the upper end of the winding 54.

Similarly, coil 55 of the relay 15 is connected between ground and the normally open contact 51 of the relay 8. Deenergization and drop-out of the relay 7 or the relay 8 removes the energizing voltage from the winding of the corresponding relay 14 or 15, thereby deenergizing that relay.

In order to permit the adjustment of the tube anode current level at which the relays 7 and 8 drop out, an adjustable level resistor 56 is connected between the anode of the tube 5 and ground, while an adjustable level resistor 57 is connected between the anode of the tube 6 and ground. The adjustments afforded by the resistors 56 and 57 are useful for correcting for minor differences in the drop-out points of the relays 7 and 8.

Summarizing the operation of the tubes 5 and 6 in the circuits just described, the tubes 5 and 6 normally pass equal currents and maintain relays 7 and 8 energized and picked up under the conditions of no input signal or a low input signal indicative of a flux level below the predetermined scram value. In the presence of increasing flux level, the negative input signal from the chamber increases, and the tube conductivity and relay holding current decrease, until relay drop-out occurs at a point determined by the parameters of the circuit and the settings of the level adjusting resistors 56 and 57. Drop-out of the relays produces the fast and slow scram actions through normally open relay contact circuits which will be described hereinafter. The opening of the normally open relay contacts 46—47 and 51—52 upon drop-out of the relays 7 and 8 seals out both the slow and fast scram relays so that the scram actions are maintained until safe conditions have been reestablished and the relays have been reset by manipulation of the resetting switches 49 and 53.

*Monitoring bridge circuit*

In addition to being connected in the circuitry described above, the tubes 5 and 6 have their output or anode-cathode circuits effectively connected in parallel in one arm of the previously mentioned bridge circuit configuration included in the channel 1. The purpose of this bridge circuit is to provide the energization for a monitoring meter 58 which is included in the apparatus for providing an indication of the relationship between the actual value of the flux level or input signal and the scram value thereof, and also as a means for giving notice of serious faults in the channel circuitry. The meter 58 is connected in the output of the bridge circuit, which will now be described in detail.

The bridge circuit in the channel 1 includes the usual pair of input or energizing terminals and pair of output terminals interconnected by four bridge arms. The bridge input terminals are formed by the positive supply conductor 48 and the grounded negative supply conductor 32 which are connected between and energized from the respective output terminals 40 and 42 of the supply 41. The bridge output terminals are formed by the aforementioned junction 44 and the adjustable contact 59 of a resistor 60 included in the bridge circuit.

A first arm of the bridge extends between the bridge input terminal 48 and the bridge output terminal 44 and includes the parallel anode-cathode or output circuits of the tubes 5 and 6. This arm can be traced from the terminal or conductor 48 through two parallel paths; the path associated with the tube 5 including the relay contacts 46 and 47, the relay coil 45, the anode-cathode path of the tube 5, and the resistor 34 connected to the bridge output terminal 44. The path associated with the tube 6 includes the contacts 51 and 52, the winding 50, the anode-cathode path of the tube 6, and the resistor 36.

A second arm of the bridge extends between the output terminal 44 and the input terminal or conductor 32, and consists of the resistor 33. A third arm of the bridge extends between the input terminal 48 and the output terminal 59 and includes in series a resistor 61 and the portion of the resistor 60 above the contact 59. Finally, a fourth arm of the bridge extends between the output terminal 59 and the input terminal 32 and includes in series a resistor 62 and the portion of the resistor 60 below the contact 59.

The meter 58 is included in a series circuit connected between the bridge output terminals 44 and 59 consisting of a resistor 63, a recorder shunt resistor 64, the meter 58, and an adjustable span-determining resistor 65. The adjustable contact 59 on the resistor 60 provides a means for setting the meter 58 to zero for zero input from the chamber and zero flux level and reactor power. The indication provided by the meter 58 is normally directly representative of ion chamber current and reactor flux level and power. A recording device 66 for these quantities is shown connected across the recorder shunt resistor 64.

As the flux level and chamber output signal change, the resulting change in the conductivities of the tubes 5 and 6 in the bridge arm changes the bridge output across the meter 58 so that the actual reactor flux level and power values are normally indicated by the meter.

The foregoing meter bridge circuit arrangement also causes the meter to give notice of certain faulty or improper conditions within the channel 1. For example, if the anode or cathode circuits of either of the tubes 5 and 6 become grounded, the resulting change in the effective bridge arm resistances causes the meter pointer to move off-scale at the high end of the scale and thereby provide an indication of the faulty condition. Additionally, a grid-cathode short-circuit in either of the tubes 5 and 6 causes the meter pointer to move off-scale at the low end of the scale, thereby providing an indication of this circuit fault. Accordingly, the indications provided by the meter 58 serve to announce improper operation of the circuit when this occurs as well as reactor operating conditions when the circuit is operating properly.

Although the meter 58 is operative to indicate the occurrence of the foregoing faults in either of the tubes 5 and 6, it should be noted that the isolating resistors 21 and 35 prevent a fault in one of the tubes from disabling the other tube. Such a fault in one tube, however, may effect a rise in the scram point for the remaining tube, but this rise is not sufficiently great to produce unsafe conditions.

Monitor relays

To insure that all of the cables or conductors interconnecting the ion chamber 3 with the channel 1 are properly in place and connected before relying on the apparatus to supervise the reactor operation, a monitor relay 67 is included in the circuits of these cables. This relay is arranged to be energized when and only when all of said cables are properly in place and connected, and is arranged to initiate and maintain the fast trip effect and scram action whenever it is deenergized and drops out.

To this end, coil 68 of the monitor relay 67 is connected between the output terminals 30 and 31 of the negative supply 20 in a series circuit which can be traced from the grounded positive terminal 31 of the supply 20 through a common ground connection to a grounded cable shield 69 surrounding the cable conductor 27, a cable shield 70 surrounding the cable conductor 24, a conductor 71, the relay winding 68, a terminal 72, and a conductor 73 to the electrode 26 of the ion chamber 3. From there the circuit continues through the cable conductor 27, the input terminal 28, and the conductor 29 back to the negative output terminal 30 of the supply 20.

It will be apparent from the foregoing description that all of the cables, conductors, shields, and connectors associated with the terminals 23, 28, and 72, for connecting the ion chamber 3 to the input of the channel 1, must be properly connected in order to maintain the relay 67 energized and to prevent this relay from producing the fast scram action. This assures that safety supervision of the reactor by the safety control apparatus will not be permitted until and unless the ion chamber 3 is properly connected to the input of the channel 1.

Fast scram trip circuit

The circuit connection by which drop out of any of the fast scram relays effectively deenergizes the rod-holding magnets 12 and 13 will now be described. As previously noted, each of these relays includes a pair of normally open contacts, all of which contacts are connected in series across the negative bias resistor 9 for the control tubes 10 and 11. Specifically, relay 7 is provided with a pair of normally open contacts 74 and 75 while relay 8 is provided with a pair of normally open contacts 76 and 77. Similarly, the corresponding fast scram relays in channel 2 are each provided with a pair of normally open contacts shown at 78—79 and 80—81 in the rectangle representing channel 2.

The series circuit connecting these and other contacts in series across the resistor 9 can be traced from the upper end terminal of resistor 9 through a conductor 82, the contacts 76 and 77, a conductor 83, the contacts 74 and 75, a conductor 84, a pair of normally open contacts 85 and 86 of the monitor relay 67, a conductor 87, the contacts 78 and 79 in channel 2, a conductor 88, a pair of contacts 89 and 90 of a monitor relay in channel 2 corresponding to the monitor relay 67 of channel 1, a conductor 91, the contacts 80 and 81, a conductor 92, contacts 93 and 94 located in other equipment, not shown, and adapted to open when the rate of change of neutron flux in the reactor exceeds a predetermined value, a resistor 95, and a conductor 96 back to the lower end terminal of the resistor 9. In the drawing of the circuit just traced, portions of the conductors 83, 84, 87, 88, and 91 have been omitted for the purpose of preventing undue complexity of the drawing. As in the case of the partially shown conductors connected to the terminals of the D.C. supplies, however, the reference characters applied to the various partially shown conductors make clear the manner in which the conductors are connected.

Control tube circuits

The resistor 9 is connected in series in a voltage dividing bias circuit between the positive terminal 40 of the supply 41 and the negative terminal 30 of the supply 20. This circuit can be traced from the positive supply terminal 40 through a conductor 97, a resistor 98, the resistor 9, a resistor 99, parallel-connected resistors 100 and 101, a resistor 102, and a conductor 103 back to the negative supply terminal 30. The bias resistor circuit just described provides a controller input or bias voltage for each of the control tubes 10 and 11 which maintains these tubes sufficiently conductive to operatively energize the respective magnets 12 and 13 as long as all of the fast scram relay contacts connected across the resistor 9 are closed.

The input or grid-cathode circuit of the control tube 10 is connected to receive this control voltage by having its control grid connected through an isolating resistor 104 to a contact 105 adjustable along the resistor 100. Similarly, the control grid of the tube 11 is connected through an isolating resistor 106 to a contact 107 adjustable along the resistor 101. The input circuits of the tubes 10 and 11 are completed by a connection between the cathodes of these tubes and ground.

As long as all of the fast scram relay contacts across the resistor 9 are closed and thus short-circuit this resistor, the grid-cathode voltages applied to the tubes 10 and 11 so bias these tubes that they pass the proper energizing current through the magnets 12 and 13. However, upon the opening of any of the contacts across the resistor 9, the latter appears in the voltage divider circuit and causes a sudden negative shift to occur in the grid-cathode voltages of the tubes 10 and 11. Since these tubes can be biased into non-conduction almost instantly, the magnitude of this negative shift is sufficient to cause the tubes to cut off completely the energizing current of the magnets 12 and 13, thereby causing the magnets to drop the reactor safety rods.

The circuit which normally connects the magnet 12 in the anode-cathode or output circuit of the control tube 10 can be traced from a positive output terminal 108 of the output channel energizing supply 16 through a conductor 109, a fuse 110, a resistor 111, the rod magnet 12, the normally open contacts 112 and 113 of the burnout relay 17, and a resistor 114 to the anode of the tube 10. The circuit is completed through the tube 10 to the cathode thereof which is connected by the common ground connection to a negative output terminal 115 of the supply 16.

Similarly, the magnet 13 is included in the output circuit of the tube 11 in a circuit which can be traced from the positive supply terminal 108 through the conductor 109, a fuse 116, a resistor 117, the magnet 13, a pair of normally open contacts 118 and 119 of the burnout relay 18, a resistor 120, and the anode-cathode path within the tube 11 back to the grounded negative supply terminal 115.

Slow scram circuit

As was previously noted, the second trip effect, in producing the slow scram action, removes the energizing or supply voltage from the magnet and control tube output circuits or channels just described. To this end, the slow scram relay 14 of the monitoring channel 1 includes a pair of normally open contacts 121 and 122, while the relay 15 includes a pair of normally open contacts 123 and 124. Also, the corresponding slow scram relays of the channel 2 respectively include a pair of normally open contacts 125 and 126, and a pair of normally open contacts 127 and 128, each of which is shown in the rectangle for the channel 2.

These four pairs of normally open slow scram relay contacts are connected in series between the input of the supply 16 and the source of A.C. energizing voltage therefor. This circuit can be traced from an A.C. supply conductor 129 through a conductor 130, the contacts 123 and 124, a conductor 131, the contacts 121 and 122, a conductor 132, the contacts 125 and 126, a conductor 133, the contacts 127 and 128, and a conductor 134 connected to one of the input energizing connections of the supply 16. The circuit is completed by a connection between the other input connection of the supply 16 and the remaining A.C. supply conductor 135.

By virtue of the circuit just described, the opening of any of the slow scram relay contacts removes the input voltage from the source 16 and hence positively deenergizes the output channels and the magnets 12 and 13 included therein.

The supply conductors 129 and 135 also supply A.C. energizing voltage to the D.C. supplies 20 and 41, as shown.

Returning to the remainder of the description of the control tubes 10 and 11 and their associated circuitry, it is noted that these tubes are pentodes having their screen grids energized from the supply 16. Specifically, the screen grid of the tube 10 is connected through a resistor 136 to the junction between the fuse 110 and the resistor 111, while the screen grid of the tube 11 is connected through a resistor 137 to the junction between the fuse 116 and the resistor 117. The purpose of these fuses is both to protect the associated circuit components, and to forestall the locking-on of the magnets at excessively high currents. The adjustable contacts 105 and 107 on the respective resistors 100 and 101 serve to permit the input voltages and output channel currents of the two control tubes to be adjusted individually as necessary. The isolating resistors 104 and 106 isolate each tube from the other and minimize the interaction between the tubes in the event of an input short-circuit on one of them.

*Heater burnout transfer circuit*

The connection and operation of the aforementioned burnout relays 17 and 18 will now be described. Each of these relays operates to transfer the corresponding magnet from the output circuit of the corresponding control tube to a dummy load, resistor 19, when and if the heater of that tube burns out. To this end, the relay 17 has a winding 138 which is effectively inserted in series with the heater of the tube 10 across the secondary winding 139 of a heater-energizing transformer 140 having a primary winding 141 connected across the supply conductors 129 and 135. This heater and relay coil circuit can be traced from one end of the transformer winding 139 through a conductor 142, the heater of the tube 10, a pair of normally open contacts 143 and 144 of the relay 17, the relay winding 138, and a common ground connection back to the remaining end terminal of the transformer winding 139.

The relay 17 also includes a normally closed contact 145 cooperating with the contact 143. The contact 145 is connected through the normally closed contacts of a reset push-button switch 146 to ground and thence to the grounded end terminal of the transformer winding 139. A normally open set of contacts on the switch 146 is connected across the relay contacts 143 and 144.

With respect to the tube 10, the dummy load circuit including the resistor 19 can be traced from the positive terminal 108 of the supply 16 through the conductor 109, the fuse 110, the resistor 111, the magnet 12, a portion of the relay contact 112 in normally closed engagement with a contact 147, a conductor 148, and the resistor 19 back to the grounded negative terminal 115 of the supply 16.

Under normal conditions, the heater of the tube 10 is intact, the relay 17 is energized and pulled in, and the magnet 12 is energized from the source 16 through the anode-cathode circuit of the tube 10. The same normal conditions will be assumed to be in effect for the tube 11 and its channel. Under these conditions, the energizing current for the heater of the tube 10 flows from the transformer secondary winding 139 through the now closed relay contacts 143 and 144 and through the relay winding 138, thereby maintaining the relay in the picked-up position. The magnet 12 is thus energized in series with the output circuit of the tube 10 through the now closed relay contacts 112 and 113. The dummy load resistor 19 is out of the circuit at this time because of the open condition of the normally closed relay contacts 112 and 147.

Upon burnout or other open-circuiting of the heater of the tube 10, the connection of the one end of the relay winding 138 to the transformer winding conductor 142 is interrupted. This deenergizes the relay 17 and causes it to drop out. Relay drop-out switches several circuits. In the first place, the opening of the normally open relay contacts 143 and 144 seals out the relay 17. Secondly, the opening of the normally open relay contacts 112 and 113 opens the energizing circuit to the magnet 12 from the tube 10. Thirdly, closing of the normally closed relay contacts 112 and 147 connects the upper end of the magnet 12 through the conductor 148 and the resistor 19 to the negative supply terminal 115 in place of the anode-cathode circuit of the tube 10 which has been removed from the circuit. On drop-out of the relay, the contact 112 is arranged to engage the contact 147 before the contact 113 disengages the contact 112. Due to this construction, and to the fact that the cathode of the faulty tube cools slowly, the energizing circuit for the magnet 12 is not interrupted during transfer from the output circuit of the tube 10 to the resistor 19. Since there is no interruption in the energization of the magnet 12, its rod does not drop, but remains held out of the reactor under the energization of the magnet 12 through the resistor 19.

A fourth action which takes place upon drop-out of the relay 17 is the closing of the normally closed contacts 143 and 145. This completes an energizing circuit for the tube heater, through the normally closed contacts of the switch 146, which is independent of the relay winding 138. Therefore, the defective tube 10 can be removed from its socket and replaced with a new tube, which will then heat up due to the heater energizing circuit now established through the relay contacts 143 and 145. This replacing of the defective tube 10 does not affect the energization of the magnet 12, of course, since the latter is energized solely through the resistor 19 at this time.

When the new tube 10 has heated sufficiently to be operative, the energization of the magnet 12 can safely be returned to the control of the tube. This return is accomplished by momentary manipulation of the reset switch 146 which performs two functions when operated. In the first place, the opening of the normally closed switch contacts removes the effective shunt around the relay coil 138 which would otherwise prevent the winding 138 from being energized by the following operation. Secondly, operation of the switch 146 causes it to close its normally open contacts, thereby energizing the winding 138 through the heater of the new tube 10. Energization of the relay coil 138 causes the relay to pick up and to perform four circuit functions. In the first place, the opening of the normally closed relay contacts 143 and 145 opens the circuit which supplied the heater warmup energizing current to the new tube independently of the relay coil 138. Secondly, the closing of the normally open relay contacts 143 and 144 seals in the relay coil 138 in series with the tube heater. Thirdly, the closure of the normally open relay contacts 112 and 113 completes the energizing circuit for the magnet 12 through the tube 10. Fourthly, the opening of the normally closed relay contacts 112 and 147 removes the dummy load resistor 19 from the energizing circuit for the magnet 12. Since the contacts 112 and 113 make before the contacts 112 and 147 break, the magnet 12 is never left without energizing current during the switching-in of the new tube 10.

For the purpose of absorbing voltage surges and protecting the relay contacts during operation of the relay 17 in cutting in and out of the magnet energizing circuit the tube 10 and the resistor 19, a condenser 149 is connected across the relay contacts 112 and 113, while a condenser 150 is connected across the relay contacts 112 and 147.

The magnet 13, tube 11, and burout relay 18 are interconnected in the same manner as for the magnet 12 and its associated components as just described. Thus, the relay 18 includes a winding 151, a movable contact 152 cooperating with a normally closed contact 153 and a normally open contact 154, and a normally closed contact 155 cooperating with the aforementioned contact 118. The circuit also includes a reset push-button switch 156 and relay contact condensers 157 and 158.

As for the relay contact 147 of the relay 17, the corresponding relay contact 155 of the relay 18 is connected to the conductor 148 which in turn is connected to the dummy load resistor 19. As long as the heater of the tube 10 is intact, and the relay 17 is energized, failure of the heater of the tube 11 causes drop-out of the relay 18 and switching or transfer of the energizing circuit for the magnet 13 from the output of the tube 11 to the resistor 19 in the same manner as that described above for the magnet 12.

If the heater of one of the tubes 10 and 11 should fail at a time at which the burnout relay of the other tube is deenergized, due to a previous failure of the heater of its associated tube, the drop-out of the burnout relay of the second tube to fail causes the energizing current for both of the magnets 12 and 13 to pass through the resistor 19. The value of this resistor is desirably so selected that the resistor will operatively energize one of the magnets as long as the current of only one magnet passes through the resistor, but will not operatively energize either magnet if the currents of both magnets are caused to flow through the resistor. In other words, a second transfer of a magnet to the resistor 19 at a time when the resistor 19 is already energizing the other magnet effectively deenergizes both magnets and causes them to drop their rods. It is desirable to select the value of the resistor 19 to perform in the above manner in order to prevent both of the magnets 12 and 13 from being removed from the influence of the fast scram action, as occurs when a magnet is removed from control by its control tube and is energized through the resistor 19. In this connection, it is noted that, although a magnet which is energized through the resistor 19 is no longer under the influence of the fast scram effect, it is still subject to the slow scram effect and thus is not completely out of the control of the apparatus.

When the apparatus is provided with more than two channels for individually controlling more than two rod magnets, the value of the dummy load resistor corresponding to the resistor 19 can be chosen so as to permit any desired, predetermined number of magnets to be energized by the dummy load resistor upon the concurrent failures of the heaters of their corresponding control tubes without causing any of these magnets to be effectively deenergized and to drop its rod. The value of this resistor would also be so chosen as to cause all of the transferred magnets to be effectively deenergized and to drop their rods upon the transfer of one or more additional magnets to the resistor above said predetermined number. In this way, failure of a number of control tube heaters below a predetermined number would remove the corresponding magnets from control of their energization by the fast scram action, but not the slow scram action, while failure of a number of such heaters equal to or in excess of said predetermined number would cause the corresponding magnets of all of the faulty tubes to be effectively deenergized independently of both of the fast and slow scram actions.

*Other portions*

In addition to the circuitry and components described in detail above, the illustrated apparatus includes other components and circuits whose operation and cooperation with the remainder of the apparatus contribute to the performance of the apparatus in providing its safety control function. Specifically, the apparatus includes a so-called coupler relay 159 having a winding 160 connected across the aforementioned resistor 95 included in the series circuit with the fast scram relay contacts connected across the bias resistor 9. As long as this series circuit remains closed, the relay 159 is maintained energized with voltage from across the resistor 9 and holds closed its normally open contacts 161 and 162. However, as a consequence of the opening of this fast scram contact circuit, the relay 159 is no longer maintained energized, whereby the contacts 161 and 162 open. This action desirably relays the fast scram action to other apparatus, not shown, such as apparatus similar to the disclosed apparatus but operative to control the magnets of additional reactor rods.

It is noted that failure of the negative voltage supply 20, if uncorrected, would deprive the apparatus of the fast scram action which should occur upon opening of the fast scram relay contacts across the resistor 9. The reason for this is that the voltage of the supply 20 is utilized in producing the negative bias voltage which is applied to the control tubes 10 and 11 to cut off their conduction when the fast scram relay contacts open. To prevent any failure or improper operation of the supply 20 from occurring unnoticed, a relay 163 has its winding 164 connected into the supply 20 so that a pair of normally closed contacts 165 and 166 of the relay will close upon any derangement of the supply 20. The closing of the contacts 165 and 166 can advantageously be arranged to actuate a suitable signalling means to announce the failure of the supply 20 to perform properly. This will permit the operating personnel to take the necessary steps to restore the operativeness of the supply 20 so that the apparatus will not be deprived of the desirable fast scram action.

In addition to the relay 163, the apparatus can advantageously be equipped with a suitable meter, not shown, for providing an indication of the output voltage of the supply 20, as well as other critical voltages and currents in the apparatus.

It is desirable in the use of the apparatus being described that the position or condition of the various relays be made known externally of the apparatus at all times, since such information advises the operating personnel as to the operating condition of the apparatus and the reactor, and also shows the cause or reason for such actions as reactor shut-down. For example, it is desirable that the fast scram relays be equipped with additional contacts which can be used to signal or indicate whether these relays are energized or deenergized.

To this end, the fast scram relay 7 is shown provided with a normally closed contact 167 which cooperates with the relay contact 47 to light a suitable lamp 168, such as a neon lamp, whenever the relay 7 is deenergized and dropped out. The energizing circuit for the lamp 168 can be traced from the positive supply conductor 48 through the normally closed relay contacts 47 and 167, the lamp 168, a conductor 169, and the coil 170 of a trouble relay 171 to ground and the negative terminal 42 of the supply 41.

As shown, a similar lamp 172 for the relay 8 is energized through a normally closed contact 173 of this relay in the same manner as for the lamp 168, the current for the lamp 172 also passing through the common conductor 169 and the trouble relay coil 170. Similarly, the corresponding relays in the channel 2, and other relays, such as the relays 67, 17, 18, 163, etc., can be equipped with suitable contacts and lamps, not shown, the lamp currents being made in each case to pass through the conductor 169 and the relay coil 170. In this way, the lighting of one or more lamps causes the relay 171 to pick up and close its normally open contacts 174 and 175 which in turn can be arranged to actuate a master signal or alarm to indicate that a relay has been actuated and a signal lamp lit, and hence that trouble has occurred. The several signal lamps can advantageously be grouped together at a single location on a panel of the apparatus, not shown, together with the aforementioned meter 58.

OPERATION UPON COMPONENT FAILURE

It should be readily apparent from the foregoing that the components and circuitry of the apparatus disclosed and described herein cause the apparatus to provide operation in accordance with the several objects and requirements for such apparatus as set forth hereinbefore. For example, the apparatus described herein is operative to provide its safety control effect and to drop the reactor safety rods, upon the attainment of a predetermined value of the monitored neutron flux, even in the presence of certain types of component failure or improper operation. Also, the apparatus is operative to drop the reactor rods, independently of the neutron flux level, as a direct result of other types of component failure or improper operation in the apparatus.

Specifically, upon the application of the trip effects to the control section, the latter is operative to provide its control effect and to deenergize the rod-holding magnets and drop the rods notwithstanding such improper operation of the control section components as failure of the bias network to supply the cut-off bias to the tubes 10 and 11, or failure of either or both of the tubes 10 and 11 resulting in anode-cathode short-circuits. In each case, the slow scram trip effect will provide the necessary control effect and reactor shutdown notwithstanding the component failures in the control section.

Similarly, the monitoring section of the apparatus is operative to apply at least one of the trip effects to the control section, when the value of the monitored flux reaches the predetermined scram value therefor, notwithstanding such failure or improper operation of the monitoring section components as failure of either or both of the contacts of the fast scram relays of the channels 1 or 2 to open, anode-cathode short circuits in one or both of the triodes 5 and 6, failure of the contacts of the slow-scram relays 14 and 15 to open, or failure of the ion chamber 3 to apply an input signal to the tubes 5 and 6. In each case of such component malfunctioning, at least one of the fast scram or slow scram relay contacts will open upon the occurrence of excessive flux level, thereby providing at least one of the trip effects to the control section.

It is noted that the foregoing operation provides the desirable continuity of reactor operation under the supervision of the safety control apparatus, with a minimum of unnecessary shut-downs of the reactor due solely to the improper operation of components within the safety control apparatus. It is also noted, however, that the foregoing types of component failures which permit the continued operation of the reactor are those which are considered not to make such continued operation unsafe or hazardous. In most cases, such component failures will be called to the attention of the operating personnel by means of one or more of the aforementioned signal lamps.

Certain component failures or improper operation of a type considered to make continued reactor operation hazardous, however, result directly in reactor shut-down, independently of the neutron flux level and/or the occurrence of the trip effects. Specifically, such improper component operation in the monitoring section as burn-out of any tube heater, shorting or grounding of the ion chamber output circuit, failure of any relay coil, or opening of the supply voltage circuits for the ion chambers causes the application of at least one of the trip effects to the control section, independently of the actual flux level.

Similarly, such component failure or improper operation in the control section as failure of the network to apply the normal positive bias to the inputs of the tubes 10 and 11, interruption of the energizing supply 16 for the output channels, or burnout of the heaters of both of the tubes 10 and 11 causes the magnets to be deenergized and to drop their rods, independently of the neutron flux level and the trip effects.

The inclusion in the apparatus of the two monitoring channels, of the two amplifier tubes in each channel, of the means for causing each monitoring channel to provide both the fast and slow scram trip effects and actions, and of the other components and circuitry shown and described, contributes to the desirable performance of the apparatus is providing operation in accordance with the foregoing objects and requirements.

It should be readily apparent from the foregoing that there has been provided novel safety control apparatus which is operative to provide a safety control or shut-down effect upon the occurrence of a predetermined value of a condition being monitored, notwithstanding the presence of certain types of component malfunctioning in the apparatus, which is operative to provide said safety control effect as a direct result of the occurrence of certain other types of component malfunctioning in the apparatus, independently of the value of said condition, and which is characterized by its dependability, speed of operation, continuity of supervision, and freedom from effecting unnecessary shut-downs.

What is claimed is:

1. Safety control apparatus comprising a control section including a plurality of components and operative to provide a control effect, notwithstanding certain improper operation of said components, in the presence of a trip effect applied to said control section, a monitoring section including a plurality of components and operative to respond to the value of an input signal to apply at least one of a plurality of trip effects to said control section, notwithstanding certain improper operation of said components of said monitoring section, when the value of said signal reaches a predetermined value, means included in said monitoring section and operative to cause the latter to apply at least one of said trip effects to said control section, independently of the value of said signal, upon certain other improper operation of the components of said monitoring section, and means included in said control section and operative to cause the latter to provide said control effect, independently of said trip effects, upon certain other improper operation of the components of said control section, said monitoring section being operative, in the absence of said improper operation of said monitoring section components, to apply to said control section substantially simultaneous first and second trip effects upon said signal reaching said predetermined value, and said control section being operative, in the absence of said improper operation of said control section components, to provide said control effect in a first and a second manner upon the application to said control section of said first and second trip effects, respectively.

2. Safety control apparatus, comprising a monitoring section having an input portion, first and second output portions, and circuit means interconnecting said input and output portions, signal means adapted to apply to said input portion a signal of a value representative of the value of a condition to be monitored, said circuit means being operative to produce separate first and second trip effects in said first and second output portions, respectively, upon the value of said condition reaching a predetermined value, a control section having first and second operating portions and at least one output channel, and operative to produce a control effect in said output channel upon the application of either of said trip effects to said operating portions, and means connecting said first and second output portions of said monitoring section to said first and second operating portions, respectively, for the application of said first and second trip effects to said first and second operating portions, respectively, said control section operating in one manner to produce said control effect in the presence of said first trip effect in said first operating portion, and operating in a different manner to produce said control effect in the presence of said second trip effect in said second operating portion.

3. Apparatus as specified in claim 2, wherein said control section is normally operative to respond to said first trip effect, and to produce said control effect, during an appreciably shorter time period than that required for said control section to respond to said second trip effect to produce said control effect.

4. Apparatus as specified in claim 2, wherein said first operating portion of said control section includes a controlling device connected to said output channel and normally controlling the application of an energizing signal to said channel, wherein said first operating portion includes control means connected to said device and operable to actuate the latter to produce said control effect to change the energization of said channel upon the application to said control means of said first trip effect, and wherein the application of said second trip effect to said second operating portion positively operates to change the energization of said channel in the same direction as the first mentioned change and independently of the operation of said device and said first trip effect.

5. Apparatus as specified in claim 4, wherein said second operating portion includes energizing means adapted to supply said energizing signal to said channel under the control of said device, and wherein the application of said second trip effect to said second operating portion effectively reduces the supply of said energizing signal to said channel independently of said device.

6. Apparatus as specified in claim 4, wherein said controlling device is an electron tube having an input path and an output path whose conductivity is controlled by the signal applied to said input path, wherein said second operating portion includes energizing means adapted to supply said energizing signal to said channel through said output path, wherein said control means includes bias signal means connected to said input path of said tube and operative to permit said energizing signal to pass through said output path to energize said channel in the absence of said first trip effect, but operative to apply a bias signal to said input path to reduce the flow of said energizing signal through said output path to said channel upon the application of said first trip effect to said bias means, and wherein the application of said second trip effect to said second operating portion effectively reduces the supply of said energizing signal to said channel independently of said tube.

7. Apparatus as specified in claim 2, wherein said control section includes a plurality of output channels and a plurality of controlling devices, each of said devices being connected to a respective one of said channels and normally controlling the application of an energizing signal to said respective one of said channels, wherein said first operating portion includes control means connected to each of said devices and operable to actuate the latter to produce said control effect to change the energization of each of said channels upon the application to said control means of said first trip effect, and wherein the application of said second trip effect to said second operating portion positively operates to change the energization of each of said channels in the same direction as the first mentioned change and independently of the operation of said devices and said first trip effect.

8. Apparatus as specified in claim 7, wherein each of said controlling devices is an electron tube including cathode heating means, wherein there are included a plurality of responsive means, each of which is responsive to the condition of a corresponding one of said heating means and is actuated upon the failure of said corresponding heating means, wherein said responsive means are operative, upon the actuation thereof by the failure of a number of said heating means below a predetermined number, to remove from control by said first trip effect, but not said second trip effect, the energization of the channels corresponding to the last mentioned heating means, and wherein said responsive means are operative, upon the actuation thereof by the failure of a number of said heating means equal to or in excess of said predetermined number, to effectively deenergize the channels corresponding to the last mentioned heating means, independently of said trip effects.

9. Apparatus as specified in claim 7, wherein each of said controlling devices is an electron tube including cathode heating means, wherein there are included a plurality of responsive means, each of which is responsive to the condition of a corresponding one of said heating means and is actuated, upon the failure of said corresponding heating means, to effect the transfer of the energization of the corresponding one of said channels from the corresponding one of said tubes to auxiliary means, and wherein such transfer of a number of said channels in excess of a predetermined number effectively deenergizes the last mentioned channels independently of said trip effects.

10. Apparatus as specified in claim 9, wherein each of said responsive means is a relay having a winding connected in series with the corresponding one of said heating means, wherein each of said tubes has an output circuit, wherein each of said relays connects the corresponding one of said channels to the corresponding one of said output circuits, for control of the channel energization by the corresponding one of said tubes, as long as the last mentioned heating means is intact, and wherein each of said relays disconnects the corresponding one of said channels from the corresponding one of said output circuits, and connects the last mentioned channel to auxiliary means for energization therethrough upon failure of the corresponding one of said heating means.

11. Apparatus as specified in claim 2, wherein said monitoring section includes a plurality of monitoring channels, each of which has an input included in said input portion, a circuit constituting a part of said circuit means, and first and second outputs, said first outputs being included in said first output portion and said second outputs being included in said second output portion, wherein said signal means includes means adapted to apply to each of said channel inputs a separate signal of a value representative of said condition, and wherein each of said monitoring channels is operative to produce said first and second trip effects in said first and second output portions, respectively, upon the value of the corresponding one of said separate signals reaching a predetermined value.

12. Apparatus as specified in claim 2, wherein said circuit means includes at least one electron tube having an output effectively included in one arm of a bridge circuit having an output, and includes indicating means connected to said output of said bridge circuit and operative to indicate a value representative of the value of said signal when said tube is operating properly, and to indicate the occurrence of the improper operation of said tube when such improper operation occurs.

13. Apparatus as specified in claim 2, wherein said signal means includes conductors adapted to connect a signal source to said input portion for the application thereto of said signal, and monitoring means responsive to the continuity of said conductors and operative to cause said control section to produce said control effect in the absence of continuity of said conductors.

14. Safety control apparatus comprising an amplifier having an input and an output, conductors adapted to connect the output of a signal source to said input, a first relay having an operating winding connected to said amplifier output and having first and second pairs of contacts which are actuated from a first to a second condition upon the output signal of said source reaching a predetermined value, a control device having an input and an output, control means connected to energizing means through the last mentioned output, bias means connected to the last mentioned input and to said first contacts and arranged to permit said control device to energize said control means from said energizing means when said first contacts assume said first condition, and arranged to bias said device to prevent the latter from energizing said control means when said first contacts assume said second condition, a second relay having an operating winding connected to said second contacts and having a pair of contacts which are actuated from a first to a second condition simultaneously with the corresponding actuation of said second contacts, and a connection between said contacts of said second relay and said energizing means arranged to prevent the latter from energizing said control means when the last mentioned contacts assume said second condition.

15. Apparatus as specified in claim 14, wherein said signal source is an ion chamber adapted to be responsive to the neutron flux level in a nuclear reactor, and wherein said control means is a reactor safety rod-holding means adapted to lower its rod into said reactor when the contacts of either of said relays assume said second condition and prevent the energization of said rod-holding means.

16. Apparatus as specified in claim 15, wherein the output signal of said ion chamber increases negatively with increased flux level to cut off said amplifier, to deenergize said first relay, and to open said first contacts upon said signal reaching said predetermined value, wherein said control device is an electron tube which is biased to cut-off by said bias means to interrupt the energization of said rod-holding means upon the opening of said first contacts, and wherein said deenergization of said first relay opens said second contacts to deenergize said second relay and to open said contacts thereof, the opening of the last mentioned contacts effectively deenergizing said energizing means.

17. Safety control apparatus including a plurality of electron tubes, each of which includes cathode heating means and an output, a plurality of control means, each of which is individual to one of said tubes for control thereby, and a plurality of responsive means, each of which is responsive to the condition of a corresponding one of said heating means and is operative to connect the corresponding one of said control means for energization by the corresponding one of said outputs when the corresponding one of said heating means is intact, each of said responsive means being arranged to transfer the energization of said corresponding control means from said corresponding output to auxiliary means upon failure of said corresponding heating means, said auxiliary means being arranged to effectively energize a number of said control means transferred thereto up to and including a predetermined number of transferred control means, but to effectively deenergize all of said transferred control means when the number transferred exceeds said predetermined number.

18. Apparatus as specified in claim 17, wherein each of said responsive means connects said corresponding control means to energizing means through said corresponding tube output as long as said corresponding heating means is intact, wherein each of said responsive means connects said corresponding control means to said energizing means through said auxiliary means independently of said corresponding output upon failure of said corresponding heating means, and wherein the value of said auxiliary means is chosen so as to permit the latter to operatively energize said transferred control means only up to and including said predetermined number.

19. Apparatus as specified in claim 18, wherein each of said responsive means is a relay having a winding connected in series with the corresponding one of said heating means, wherein each of said relays causes the current of said corresponding control means to pass through said corresponding output as long as said corresponding heating means is intact, wherein said auxiliary means is an impedance device, wherein each of said relays causes the current of said corresponding control means to pass through said impedance device upon failure of said corresponding heating means, and wherein the valve of said impedance device is so chosen that the current flow through the latter, as a result of the transfer to said impedance device of a number of said control means in excess of said predetermined number, prevents said impedance device from operatively energizing any of said transferred control means.

References Cited in the file of this patent

UNITED STATES PATENTS

| | | |
|---|---|---|
| 1,917,064 | Romnes | July 4, 1933 |
| 2,547,011 | Jacobsen | Apr. 3, 1951 |

OTHER REFERENCES

AEC Research and Development Report KAPL–1528, January 17, 1956.

IRE Transactions on Nuclear Science, vol. NS–1, No. 1 (September 1954), pp. 2–11.

"Rapid Response Radiation Alarm," Review of Scientific Instruments, vol. 12, No. 12, December 1949.

"Filament Protection in Vacuum Tubes," Wireless Age, August 1921.